3,176,033
NOVEL CUPRIC PYRUVATE COMPOUNDS AND FUNGICIDAL COMPOSITIONS THEREOF

Michel Guyot, La Varenne Saint Hilaire, and André Couillaud, Rosny-sous-Bois, France, assignors to Roussel-UCLAF S.A., Paris, France, a corporation of France
No Drawing. Filed Apr. 2, 1962, Ser. No. 184,585
Claims priority, application France, Apr. 17, 1961, 858,955
2 Claims. (Cl. 260—438)

The invention relates to the novel cupric pyruvate having the formula

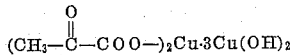

and to a novel process for the preparation of the said cupric pyruvate. The invention further relates to novel fungicidal compositions containing the said cupric pyruvate.

It is an object of the invention to provide the novel compound, cupric pyruvate.

It is another object of the invention to provide a process for the preparation of cupric pyruvate.

It is a further object of the invention to provide novel fungicidal compositions containing cupric pyruvate.

It is an additional object of the invention to provide a novel method of combatting fungi.

These and other objects and advantages will become obvious from the following detailed description.

The novel cupric pyruvate of the invention has the formula

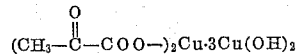

and is prepared by the partial neutralization of freshly precipitated cupric hydroxide with pyruvic acid according to the equation:

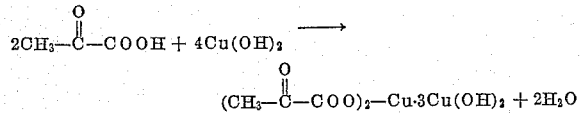

and recovering the precipitated product by filtration.

The novel fungicidal compositions of the invention contain cupric pyruvate having an average particle diameter of 1 micron and dispersing agents, wetting agents, and/or adhesives, and has a 10 to 20% copper content. The composition can be prepared by filtering the cupric pyruvate product and mixing the desired dispersing agents, wetting agents and adhesive therewith without drying or preliminary grinding of the cupric pyruvate.

Examples of suitable agents for preparing the fungicidal compositions are the alkali metal, alkaline earth metal and ammonium salts of ligne sulfonates; the alkali metal, alkaline earth metal and amine salts of alkyl aryl sulfonates; alkyl sulfosuccinates; polyphosphates; derivatives of alginic acid; methyl oleyltaurides; polyvinyl alcohols; hydroxyethylcelluloses; the condensation products of urea and formaldehyde; the condensation products of ethylene oxide and alkylphenols; and alkali metal, alkaline earth metal and ammonium salts of lignosulfite and dinaphthylmethane disulfonate. The preferred agents are a mixture of sodium lignosulfite and sodium dinaphthylmethane disulfonate.

The novel method of combating plant fungi comprises contacting the plants to be protected with an effective amount of an aqueous suspension of a composition containing cupric pyruvate, the said composition having a copper content of 10 to 20%. If the concentration of the composition in the suspension is 0.125%, practically complete protection is obtained.

In the following example there are described several preferred embodiments to illustrate the invention. However, it should be understood that the invention is not intended to be limited to the specific embodiments.

EXAMPLE I

While keeping a suspension of 260 gm. of freshly precipitated, pasty copper hydroxide containing 7.5% of copper and 160 cc. of water well homogenized by mechanical agitation, a mixture of 11 gm. of pyruvic acid and 50 cc. of water was added over a period of about 45 minutes. The suspension changed from a blue color to a blue-green color. The agitation was reduced and the reaction mixture was allowed to stand overnight and was then filtered. 80 gm. of a humid precipitate of cupric pyruvate was obtained which could be used as such to prepare fungicidal compositions.

By drying the product under vacuum, 3.5% of water of solvation was lost and a green powder testing 52% copper (theoretical—47.8%) and 35% pyruvic acid (theoretical—32.8%) was obtained. The powder was insoluble in water but was soluble in pyruvic acid from which it could be reprecipitated by evaporation of the said acid.

80 gm. of the humid precipitate of cupric pyruvate were added under vigorous agitation to a mixture of 9.3 gm. of an aqueous solution containing 20% of sodium lignosulfite, 5.5 gm. of an aqueous solution of 20% of sodium dinaphthyl methane disulfonate, 8 gm. of micronized powdered clay, and 10 gm. of distilled water. There was obtained 112.8 gm. of a blue-green paste having a 15% copper content. The paste was thixotropic and appeared thick but was fluidized by agitation in a vessel. The product could be spontaneously diluted without difficulty just before use as a fungicide.

The said fungicide composition was compared to the extremely fine tetracupric oxychloride described in French patent application Serial No. 856,745, filed on March 24, 1961, entitled "Antifungicidal Cupric Product and Its Process of Preparation." The compounds in aqueous solutions were applied to grape leaves which then were contaminated massively three times over a period of four weeks with *Plasmopara viticola* followed by artificial rain each time. The results are summarized in Table I:

*Table I*

| Dosage | Highly divided tetracupric oxychloride preparation in the form of a paste containing 15% copper | Product of Example I in a paste containing 15% copper |
|---|---|---|
| | *Percent* | *Percent* |
| Minimum dose for practically total protection | 0.5 | 0.125 |
| Percent of copper in said minimum dose | 0.075 | 0.019 |
| Minimum dose to start phytotoxicity | 0.6 | ≥0.25 |

The product of the invention is about 4 times more active than the prior art product and has a greater safety margin before phytotoxicity begins.

Various modifications of the product of the invention may be made without departing from the spirit or scope thereof, and it is to be understood that the invention is to be limited only as defined in the appended claims.

We claim:
1. A compound having the formula

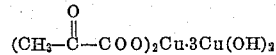

2. A process for the preparation of cupric pyruvate having the formula $$(CH_3-\overset{O}{\underset{\|}{C}}-COO)_2Cu \cdot 3Cu(OH)_2$$

which comprises partially neutralizing freshly precipitated cupric hydroxide with pyruvic acid to form cupric pyruvate and recovering the latter.

References Cited by the Examiner

UNITED STATES PATENTS

| | | | |
|---|---|---|---|
| 1,009,864 | 11/11 | Schneider | 260—438 |
| 1,910,223 | 5/33 | Leibbrandt | 260—438 |
| 2,955,977 | 10/60 | Warner | 167—22 |
| 3,003,915 | 10/61 | Borick et al. | 167—22 |
| 3,056,721 | 10/62 | Allais et al. | 260—438 |

OTHER REFERENCES

Gelles et al., J. Chem. Society (London), 1958, pages 3673 to 3684 (pages 3673, 3674, 3678, 3682 and 3684 principally relied upon).

TOBIAS E. LEVOW, *Primary Examiner*.

MORRIS O. WOLK, *Examiner*.